No. 724,344. PATENTED MAR. 31, 1903.
H. G. SLINGLUFF.
PROCESS OF MAKING SHEET GLASS.
APPLICATION FILED MAR. 25, 1902.
NO MODEL. 3 SHEETS—SHEET 1.
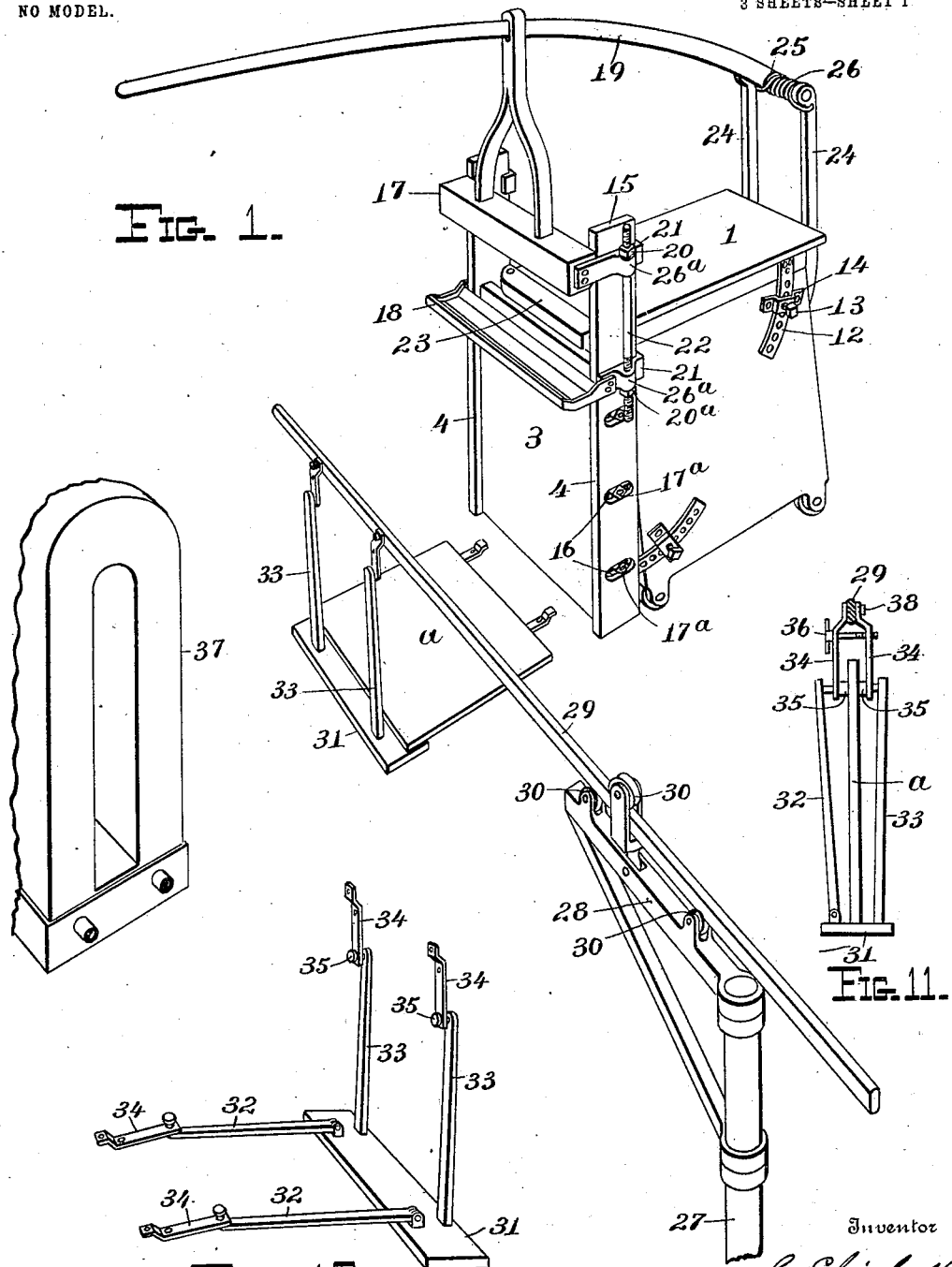
Witnesses
Percy C. Bowen
M. H. Miles
Inventor
H. G. Slingluff
By Howson & Howson,
Attorneys.

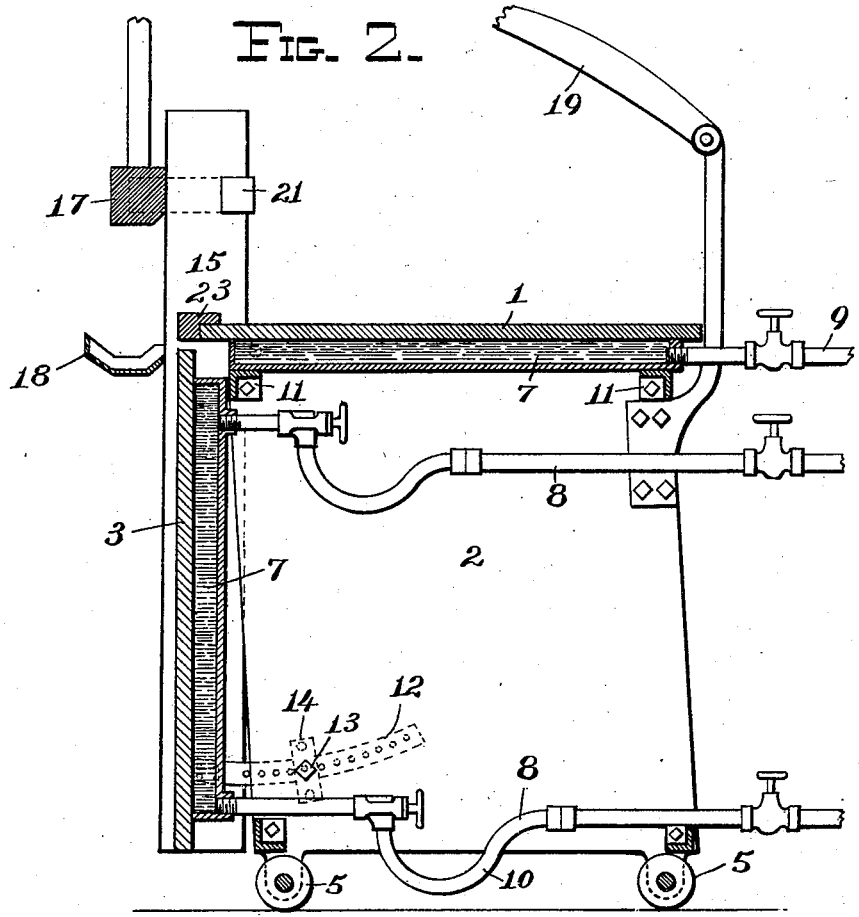
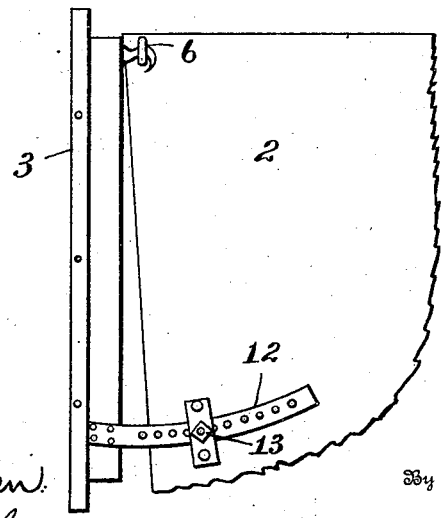

No. 724,344. PATENTED MAR. 31, 1903.
H. G. SLINGLUFF.
PROCESS OF MAKING SHEET GLASS.
APPLICATION FILED MAR. 25, 1902.
NO MODEL. 3 SHEETS—SHEET 3.
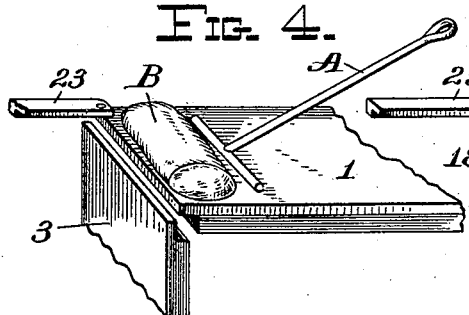
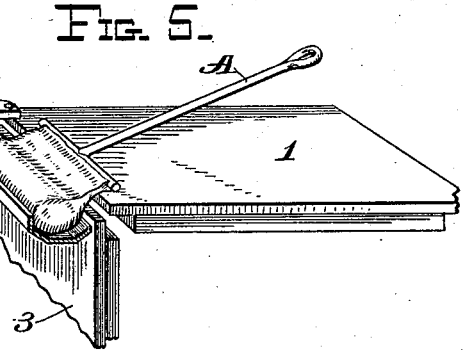
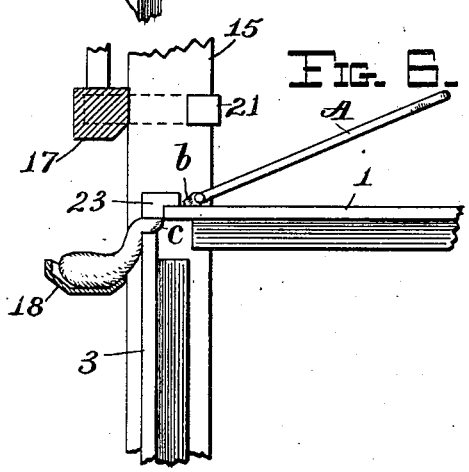
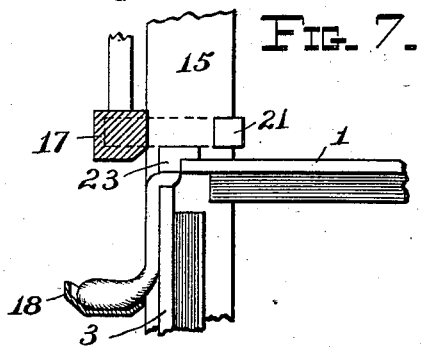
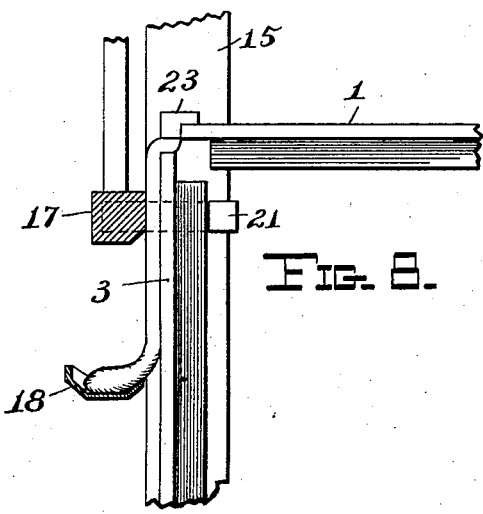
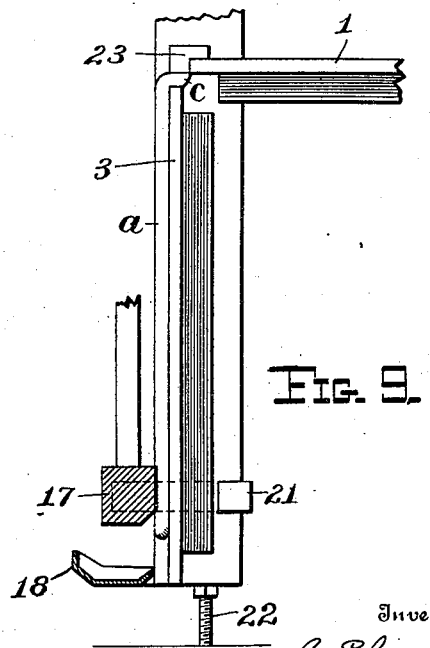
Witnesses
Percy C. Bowen
M. H. Miles
Inventor
H. G. Slingluff
By Howson & Howson,
Attorneys.

UNITED STATES PATENT OFFICE.

HARRY G. SLINGLUFF, OF HARTFORD CITY, INDIANA.

PROCESS OF MAKING SHEET-GLASS.

SPECIFICATION forming part of Letters Patent No. 724,344, dated March 31, 1903.

Application filed March 25, 1902. Serial No. 99,916. (No specimens.)

*To all whom it may concern:*

Be it known that I, HARRY G. SLINGLUFF, a citizen of the United States, and a resident of Hartford City, Indiana, have invented certain new and useful Improvements in the Process of Making Sheet-Glass, of which the following is a specification.

My invention relates to the manufacture of glass, and more especially to the art of making sheet-glass.

My object is to provide a process of making sheet-glass by the practice of which the cost of manufacture may be materially reduced and glass of maximum brilliancy produced without the use of the customary means for polishing the surface of the glass heretofore employed, and my further object is to simplify the process of manufacture, so that the employment of skilled labor is largely obviated and whereby the glass may be produced in the most effective, expeditious, and economical manner.

In carrying out my improved process in its general application to the manufacture of ordinary sheet-glass I utilize the elemental action of stretching the glass previous to subjecting it to the pressure of a suitable pressing device to secure the brilliant effect heretofore derived by polishing the surface of the glass by various kinds of polishing and rubbing devices, and to effect this stretching at the proper time I so manipulate the mass of molten glass constituting a batch of the required quantity to make a sheet of the desired dimensions that the weight of the glass itself is caused to assist in forming the sheet and to impart the needed tension to the mass to bring it to the proper stretched condition in advance of the action of the presser, which follows immediately upon the stretching action. In order to accomplish this combined stretching and pressing action, I find that it is preferable to suspend the pressing table or plate in a substantially vertical plane and allow the molten glass to flow or be carried along the surface of the same in such a way that the mass of glass may move at a definite distance in advance of a presser which presses the glass into the required thickness against the vertically-disposed table or plate, while the upper portion or edge of the molten mass is held by suitable clamping or pressure means against the upper edge of the table or plate. A portion of the mass of glass being held in place at the upper edge of the vertical table, the batch, which is free to move, will flow downward by gravity along the table, and as it flows it will stretch the glass into a comparatively thin sheet, which will be pressed into the desired thickness and smoothed by the presser following the moving mass of glass.

The details of my process will be better understood by reference to the accompanying drawings, wherein a convenient apparatus for practicing the said process is illustrated, and in which drawings—

Figure 1 is a perspective view of an apparatus by which my process may be practiced. Fig. 2 is a sectional side elevation. Fig. 3 is a detail hereinafter referred to. Figs. 4, 5, 6, 7, 8, and 9 are diagrammatic views of essential parts of the press, illustrating the various stages of the process. Figs. 10 and 11 are details of the glass-transferring slings.

Referring now to the drawings, in which the same reference characters relate to the same or corresponding parts in all the views, the numeral 1 indicates a suitable iron table, having a polished surface, horizontally supported upon cast-iron side frames 2, connected by cross-bars 11, said supporting structure being preferably mounted upon rollers 5 to permit easy transfer from place to place in the factory. A vertical iron table 3, having a polished surface, is pivotally suspended by hooks 6 at its upper end engaging pins on the side plates 2, as shown in Fig. 3, and at its lower end are curved rack-bars 12, held in straps 14 by locking-pins 13. Each table is preferably provided with a chamber or passage 7, through which water is constantly circulated by means of the pipes 8, for the table 3, and 9, for the table 1, flexible sections 10 being inserted in the pipes 8 to permit the movement of the table 3 on its pivot and all of said pipes being connected with a suitable source of water-supply. (Not shown.)

The table 1 rests upon the side frames 2 and the upper cross-bars 11 and is provided with a curved rack-bar 12, which may be adjusted and held in different positions by the locking-pin 13, passing through the strap 14, secured to the fixed side frames 2. The table 3 is made similarly adjustable by corresponding elements, (indicated by the same letters,) or any other suitable adjusting means may be employed for this purpose on each table. Attached to the sides of the table 3 are guide-bars 15, which project an equal distance on each side of the table, such distance being determined by the thickness of the sheet of glass to be made, as indicated by the numeral 4. These guide-bars are preferably adjustable to provide for sheets of different thicknesses, and for this purpose I have shown slots 16, in which are countersunk bolts 17ª. The guide-bars may be released by unscrewing the confining-nuts on the bolts, and after shifting the guide-bars to the desired position the nuts are again tightened to fix said bars in place.

Slidably mounted on the guide-bars 15 is a presser 17, carried by slides 21, embracing and movably mounted on said bars 15. The presser is connected by a link to a lever 19, fulcrumed at 25 to standards 24, fixed to the frame of the machine. This lever 19 is normally held up by any suitable means, such as a coil-spring 26, having one end fixed to the lever and the other end to one of the standards 24 or any other fixed part of the machine.

Below the presser 17 is a traveler 18, here shown in the form of a shallow trough, which is lined with graphite to prevent the glass from adhering. This traveler is carried by slides 21, slidably mounted upon guide-bars 15, each of which slides is provided with an ear or lug 26ª, through which loosely passes a rod 22, provided with screw-threaded ends, upon which are mounted confining-nuts 20ª 20ª. These nuts hold the presser and traveler a predetermined distance apart, which distance may be varied by proper adjustment of either of the nuts.

I prefer to provide in connection with the press a shifting-crane for transferring the sheet of glass from the table to a furnace 37. This crane consists of the usual post 27, carrying a swinging arm 28, upon the top of which is mounted a traveling rod 29, suitably confined by rollers 30 to the swinging arm, and upon this arm is preferably fixedly mounted an asbestos sling, which receives the sheet of glass $a$ from the table, as shown in Fig. 1. By swinging the arm 28 from the table in line with the opening in the furnace when the press is located near the same and pushing the rod 30 the sheet of glass is conveyed to the furnace, where it is subjected to a proper degree of heat for fire-polishing and annealing. These asbestos slings in the instance shown are made of a bottom plate 31, from which rises two fixed arms 33 and two pivoted arms 32, the latter being adapted to be lowered in the position shown in Figs. 1 and 10 to receive the sheet of glass, after which they are closed, as shown in Fig. 11, and clamped together by the clamping-screw 36.

At the upper ends of each of the arms is a pivoted clamping-jaw 34, through a slot in the lower end of which passes a pin having asbestos contact-points 35, adapted to press against the sides of the glass and hold the same in upright position and prevent sagging while the sheet is being transferred to and remains in the furnace.

The weight of the glass upon the bottom of the slings, it will be observed, tends to press the asbestos contact-points into contact with the sheet and maintain the same in proper position. The glass sheet is, therefore, not only held at the top, with its sides free from contact with any substance which would otherwise destroy or mar the surface brilliancy and polish of the sides, but the support afforded by the base of the slings is sufficient to prevent the possible thinning of the sheet by its own weight while undergoing the fire-polishing step.

With this brief description of the apparatus shown I will now describe the manner of carrying out the process, referring to Figs. 4 to 9. The batch of glass is conveyed by means of an ordinary ladle of sufficient capacity to hold the amount required for a sheet from the melting furnace or pot to the table and placed thereon, as shown in Fig. 4, whereupon the T-iron, such as that indicated by A, is pressed against one side of the batch, the molten glass adhering thereto, in which position the traveler 18 is just below the table 1. The T-iron is then pushed forward, carrying with it the batch of glass which flows over the edge of the table 1 and rests in the traveler 18, as shown in Fig. 5. The T-iron after being pushed as close to the edge of the table as possible is drawn back a sufficient distance to permit the cut-off plate 23 to be swung into position, as shown in Fig. 6, thereby cutting off the batch of glass from the T-iron, to which a small strip $b$ adheres. This movement of the cut-off plate not only severs the batch from the T-iron, but clamps or binds a small stratum at the upper edge of the batch between the upper edge of the table 3 and the bottom of the said swinging plate, so that the glass is held by pressure at this point, as indicated at $c$, Fig. 6. The distance between the lower part of the cut-off plate, which preferably coincides with the bottom of the table 1, is made equal to the desired thickness of the sheet to be made—that is, this distance will equal the extension or projection 4 of the guide-bars beyond the flat surface of the table 3. With the glass held in the position shown in Fig. 6 the operator grasps the lever 19, forcing it downward, the weight of the glass batch B in the traveler causing the latter to precede the advancing presser or plunger 17, the latter of which is guided by the guide-bars 15. By this action the glass is caused to flow by its own weight downwardly over the flat surface of the table 3, and is thereby stretched in advance of the pressing action. While in this stretched condition the plunger or presser 17 smooths the surface of the glass and presses the same against the flat surface of the vertical table 3, producing a sheet of glass of the desired thickness, such presser continuing its downward movement, as shown in Figs. 8 and 9, until the whole sheet has been stretched and pressed into the desired form. The rod 22, contacting with the floor, stops the traveler at its lowest point and permits the presser to approach the traveler in completing its action, as shown in Fig. 10.

The depression of the plunger and traveler, as above described, throws the weight of the glass upon itself as the traveler moves, and hence the glass by its own weight materially assists in forming the sheet, the action of the presser serving mainly to press the surface even and smooth. The distance between the plunger or presser and the traveler is determined by the softness of the glass and the thickness of the sheet to be made—for example, the lighter the sheet to be made the greater will be the stretch required and the greater the distance between the traveler and presser.

Under the ordinary operation the table 3 is maintained in a vertical position, as indicated in the drawings; but in some cases where the glass is more ductile than the average the table may be adjusted at an angle to the vertical by means of the rack-bars 12 and locking-pins 13, as hereinbefore indicated.

In the practice of my process it will be observed that as the mass of metal lies below the pressing roller or plunger the particles composing the said mass are not jammed or crowded together, since the weight of metal below the point of contact of the plunger or roller pulls and stretches the surplus metal away from said contact-point, leaving only a quantity of glass sufficient to make the sheet of the thickness already predetermined at the top of the plate, thereby avoiding the crizzled effect that otherwise would be produced if the quantity of glass at that point were more than necessary to produce said thickness of the sheet.

After the glass has been pressed into shape, as indicated in Fig. 10, the lever 19 is raised to its uppermost position, carrying with it the plunger and traveler, the cut-off plate is thrown back, and the sheet removed and flattened by any of the usual flattening means. In some cases a small percentage of glass, owing to the varying quality of material, may need a polish, which is imparted thereto by means of a heat given to it in any suitable furnace, one conventionally shown at 37 in the drawings, in which case the sheet of glass is transferred to the asbestos sling 31 on the traveling rod 29, carried by the crane, and this rod swung into position in front of the furnace and the sheet conveyed thereinto, as hereinbefore indicated. The heat of the furnace will depend upon the quality of the glass, care being taken that it is not high enough to melt the glass; but I may say that the heat necessary to the polishing approximates 1,600°. This heat may vary considerably, according to different qualities of glass and the length of time for which the glass remains in the furnace. The success of this step of the process depends upon the length of time the sheet is permitted to remain in the furnace and the intensity of the heat. For example, a thin sheet cannot remain in the furnace as long as a thicker heavier sheet, and I may add that the higher the heat that can be maintained the better will be the polishing effect and the quicker will the said polishing effect be attained, and I have found that under the best conditions a sheet of glass can be polished in one minute or less.

In most cases the fire-polishing may be dispensed with, as I find that a high grade of glass with a sufficiently brilliant polish can be produced by the combined stretching and pressing action. Furthermore, glass made in other ways, such as by rolling, where the brilliancy of surface has been lost, can have this surface brilliancy restored by the fire-polishing step herein described.

In a small percentage of glass sheets produced by my process it sometimes happens that the surface is blurred slightly, and the fire-polishing quickly restores this brilliancy of the glass so blurred and materially assists in annealing the sheet.

I do not in this application claim the process of fire-polishing sheet-glass herein described, as that forms the subject of my divisional application filed September 12, 1902, Serial No. 123,175.

I claim as my invention—

1. As an improvement in the art of making sheet-glass, the process of forming a sheet of glass from a mass of molten glass of the required amount which consists in producing the required thickness at the top of the mass by pressure and suspending the said mass from its top and then permitting said mass by its own weight to stretch the glass into sheet form of the thickness so determined, substantially as described.

2. As an improvement in the art of making sheet-glass, the process of forming a sheet of glass from a mass of molten glass which consists in suspending the mass from its top and causing the same to flow downwardly by its own weight into sheet form, and pressing the same into a flat sheet, substantially as described.

3. As an improvement in the art of making sheet-glass, the process of making a sheet of glass from a mass of molten glass which consists in suspending the mass of molten glass of the required amount from its top and producing the required thickness by pressure applied to the said top portion, then causing the mass to stretch into sheet form against a flat surface by the weight of the said suspended mass and then pressing the stretched glass against said surface, substantially as described.

4. As an improvement in the art of making sheet-glass, the process of forming a sheet of glass from a mass of molten glass, which consists in suspending the said mass and causing the molten mass to flow downwardly by its own weight against a flat surface, and pressing the sheet thus formed against said surface, substantially as described.

5. As an improvement in the art of making sheet-glass, the process of forming a sheet of glass from a mass of molten glass, which consists in binding a stratum of the mass of the thickness of the finished sheet to one end of a flat table, and causing the mass to flow downwardly over the surface of said table and following said flowing mass with a pressing action, to smooth the sheet, substantially as specified.

In testimony whereof I have signed my name to this specification in the presence of two subscribing witnesses.

HARRY G. SLINGLUFF.

Witnesses:
L. O. EDSON,
B. M. DALE.